United States Patent
Jones et al.

(10) Patent No.: US 11,332,026 B2
(45) Date of Patent: May 17, 2022

(54) SYSTEM AND METHOD FOR UNLOCKING A POWER CHORD DURING CHARGING OF A VEHICLE BASED ON A USER LOCATION

(71) Applicant: GM GLOBAL TECHNOLOGY OPERATIONS LLC, Detriot, MI (US)

(72) Inventors: Brandon R. Jones, White Lake, MI (US); Matthew S. Stout, Royal Oak, MI (US); Natalie R. Stokes, Grand Blanc, MI (US); David A. Lafave, Livonia, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 207 days.

(21) Appl. No.: 16/558,994

(22) Filed: Sep. 3, 2019

(65) Prior Publication Data

US 2021/0061112 A1    Mar. 4, 2021

(51) Int. Cl.
| | |
|---|---|
| *B60L 53/16* | (2019.01) |
| *H02J 7/00* | (2006.01) |
| *G07C 5/08* | (2006.01) |
| *B60L 53/60* | (2019.01) |

(52) U.S. Cl.
CPC .............. *B60L 53/16* (2019.02); *B60L 53/60* (2019.02); *G07C 5/0833* (2013.01); *H02J 7/007* (2013.01); *H02J 7/0047* (2013.01)

(58) Field of Classification Search
CPC ........ B60L 53/16; B60L 53/60; B60L 53/305; B60L 53/14; B60L 2250/22; H02J 7/0047; H02J 7/007; G07C 5/0833
USPC ....................................................... 320/109
See application file for complete search history.

(56) References Cited

U.S. PATENT DOCUMENTS

| | | | |
|---|---|---|---|
| 10,232,729 B2 * | 3/2019 | Jeon ......................... B60L 1/08 |
| 2010/0204865 A1 * | 8/2010 | Nakamura ................ B60L 3/00 701/22 |
| 2011/0282527 A1 * | 11/2011 | Inbarajan ................ B60L 53/00 701/22 |
| 2017/0066334 A1 * | 3/2017 | Sindia ................ H02J 7/007188 |
| 2018/0215280 A1 * | 8/2018 | Lee ........................ B60L 53/305 |
| 2020/0009983 A1 * | 1/2020 | Oshima ................ G05B 19/042 |

* cited by examiner

*Primary Examiner* — Nathaniel R Pelton
(74) *Attorney, Agent, or Firm* — Cantor Colburn LLP

(57) ABSTRACT

An electric vehicle, and a system and method for charging the electric vehicle. The system includes a user locating system and a processor. The user locating system is configured to determine a location of the user. The processor is configured to charge the vehicle at a first charging rate and determine a location of a user of the vehicle with respect to the vehicle. The processor adjusts the charging of the vehicle from the first charging rate to a second charging rate when the location of the user is within a selected distance from the vehicle.

15 Claims, 5 Drawing Sheets

SYSTEM AND METHOD FOR UNLOCKING A POWER CHORD DURING CHARGING OF A VEHICLE BASED ON A USER LOCATION

INTRODUCTION

The subject disclosure relates to a system and method for safely charging an electric vehicle and, in particular, to a method for adjusting a charging rate of the vehicle based on a proximity of a user to the vehicle.

Charging stations are available for electric vehicles which have run low on battery power. An electric vehicle is charged by inserting a charge cord from an Electric Vehicle Supply Equipment (EVSE) into a charging receptacle of the vehicle. In order to reduce charging times, the charging process can occur at charging rates with high amperage levels. If not careful, a user can disconnect the charge cord from the charging receptacle during the charging process and cause arc flashing and/or other undesirable effects. Accordingly, it is desirable to be able to reduce a charging rate when a user is nearby or approaching the vehicle to reduce the occurrence of such events.

SUMMARY

In one exemplary embodiment, a method of charging an electric vehicle is disclosed. The vehicle is charged at a first charging rate. A location of a user of the vehicle with respect to the vehicle is determined at a processor. The charging of the vehicle is adjusted from the first charging rate to a second charging rate when the location is within a selected distance from the vehicle.

In addition to one or more of the features described herein, the method further includes determining the location of the user via a communication between the electric vehicle and a communication device associated with the user. The method further includes determining a boundary surrounding at least a part of the electric vehicle, charging the electric vehicle at the first charging rate when the user is outside of the boundary and charging the vehicle at the second charging rate when the user is inside of the boundary. The method further includes sounding an audio signal when a charge cord is manually unlocked from a charging receptacle and the user is not within the selected distance. The method further includes setting a proximity timer upon commencing the charging of the vehicle and adjusting the charging of the vehicle to the second charging rate when the user is within the selected distance at or after a time at which the proximity timer expires. The method further includes unlocking a charge cord from the vehicle when the charging of the vehicle is adjusted to the second charging rate. The method further includes relocking the charge cord to the vehicle when the user moves outside the selected distance.

In another exemplary embodiment, a system for charging an electric vehicle is disclosed. The system includes a user locating system and a processor. The user locating system is configured to determine a location of the user. The processor is configured to charge the vehicle at a first charging rate and adjust the charging of the vehicle from the first charging rate to a second charging rate when the location is within a selected distance from the vehicle.

In addition to one or more of the features described herein, the user locating system is further configured to determine the location of the user via a communication with a communication device associated with the user. The user locating system is further configured to define a boundary surrounding at least a part of the electric vehicle and the processor is further configured to charge the electric vehicle at the first charging rate when the user is outside of the boundary and charge the vehicle at the second charging rate when the user is inside of the boundary. The processor is further configured to sound an audio signal when a charge cord is manually unlocked from a charging receptacle and the user is not within the selected distance. The processor is further configured to set a proximity timer upon commencing the charging the vehicle and adjust the charging of the vehicle to the second charging rate when the user is within the selected distance at or after a time at which the proximity timer expires. The processor is further configured to unlock a charge cord from the vehicle when the charging of the vehicle is adjusted to the second charging rate. The processor is further configured to relock the charge cord to the vehicle when the user moves outside the selected distance.

In yet another exemplary embodiment, an electric vehicle is disclosed. The electric vehicle includes a user locating system and a processor. The user locating system is configured to determine a location of a user. The processor is configured to charge the vehicle at a first charging rate and adjust the charging of the vehicle from the first charging rate to a second charging rate when the location is within a selected distance from the vehicle.

In addition to one or more of the features described herein, the user locating system is further configured to determine the location of the user via a communication with a communication device associated with the user. The user locating system is further configured to define a boundary surrounding at least a part of the electric vehicle and the processor is further configured to charge the electric vehicle at the first charging rate when the user is outside of the boundary and charge the vehicle at the second charging rate when the user is inside of the boundary. The processor is further configured to sound an audio signal when a charge cord is manually unlocked from a charging receptacle and the user is not within the selected distance. The processor is further configured to set a proximity timer upon commencing the charging the vehicle and adjust the charging of the vehicle to the second charging rate when the user is within the selected distance at or after a time at which the proximity timer expires. The processor is further configured to unlock a charge cord from the vehicle when the charging of the vehicle is adjusted to the second charging rate and to relock the charge cord to the vehicle when the user subsequently moves outside the selected distance.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
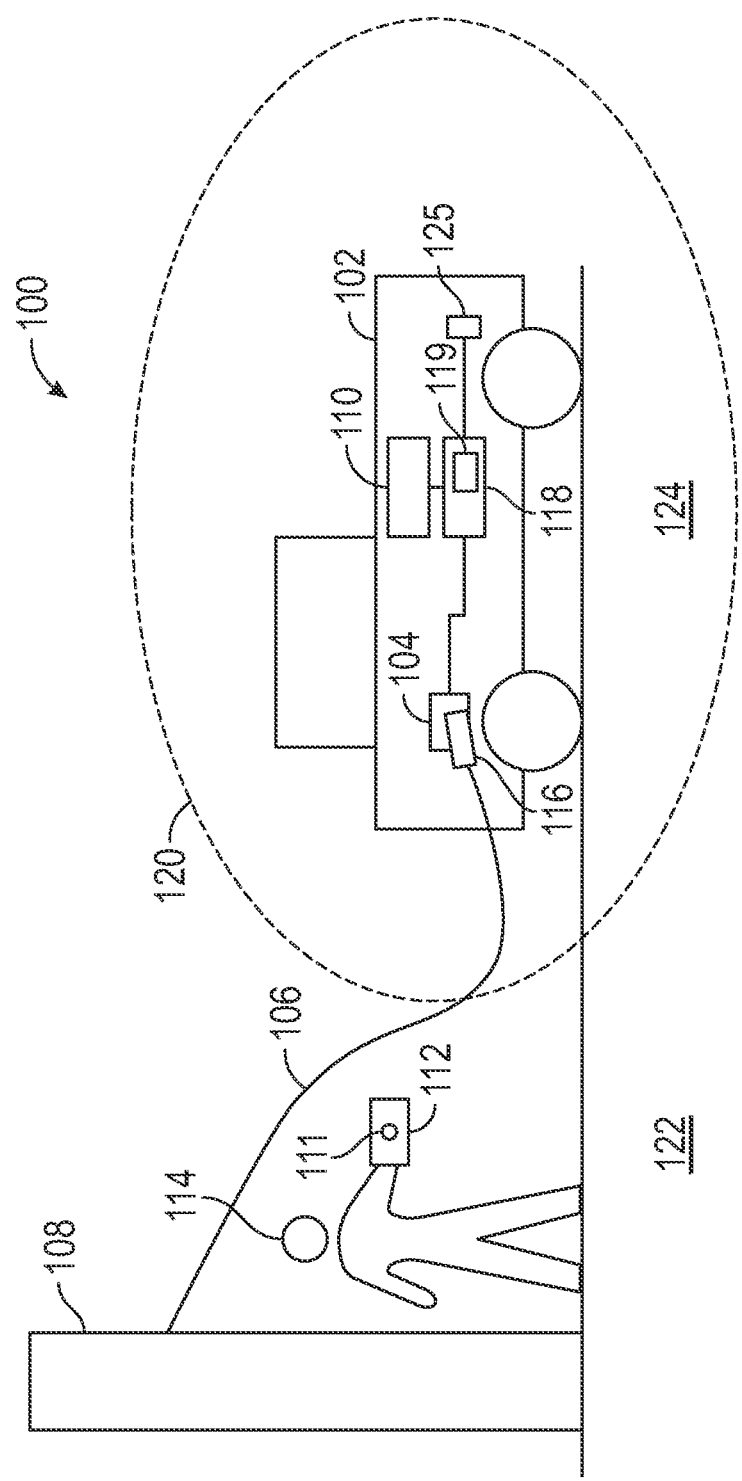
FIG. 1 shows a charging station for charging an electric vehicle.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a charging station 100 for charging an electric vehicle 102. The charging station 100 includes an Electric Vehicle Supply Equipment (EVSE) 108. A charge cord 106 is used to couple the EVSE 108 to the electric vehicle 102 to transfer electrical charge from the EVSE 108 to the electric vehicle 102. The electric vehicle 102 includes a charging receptacle 104 into which the charge cord 106 can be inserted to facilitate charging of the electric vehicle 102. The charge cord 106 can be an integral component of the EVSE 108 or can be a separate charging device that is provided with the electric vehicle 102 and which is plugged into the EVSE 108 and charging receptacle 104 for the charging process. The charge cord 106 includes a charge coupler 116 at one end that can be inserted into the charging receptacle 104 and locked to the charging receptacle during the charging process.

The electric vehicle 102 includes a user location system 110, such as a Passive Entry Passive Start (PEPS) system, that communicates with a communication device 112 such as a key fob that is carried by a user 114, driver or operator. The electric vehicle 102 further includes a control unit 118 having a processor 119 therein for performing various operations. The control unit 118 and user location system 110 can form a system for controlling the charging of the electric vehicle 102. The control unit 118 and the user location system 110 can be separate components or integrated components. The control unit 118 can be in communication with the user location system 110 to query a user's location. The control unit 118 can further be in communication with the charging receptacle 104 to enable various operations, such as locking and unlocking of the charge cord 106 to the receptacle, changing charging rates, etc. The control unit 118 can be further in communication with alarm 125 to generate a warning signal at the electric vehicle 102. When the user 114 in possession of the communication device 112 approaches to within a selected distance of the electric vehicle 102, the user location system 110 recognizes the communication device 112 and informs the control unit 118, which performs various functions based on the proximity of the user 114 and communication device 112 to the electric vehicle 102.

The user location system 110 can recognize or establish a boundary 120 around the electric vehicle 102 or around a portion of the electric vehicle. The boundary 120 separates the surroundings of the electric vehicle 102 into a first region 122 that is away from the electric vehicle and a second region 124 that includes the electric vehicle. The boundary 120 can be set at any desired distance, such as five meters, for example. In general, the control unit 118 can control the charging rate of the electric vehicle based on which region the communication device 112, and thus the user 114, is in. When the communication device 112 is in the first region 122, the EVSE 108 charges the electric vehicle 102 at a first rate. When the communication device 112 is in the second region 124, the EVSE 108 charges the electric vehicle 102 at a second rate. In various embodiments, the second rate is less than the first rate. Reducing the charging rate (also referred to herein as "derating") when the user 114 is near or is approaching the electric vehicle 102 reduces the possibility of an occurrence of unsafe events, such as arc flashing when the charge cord 106 is removed from the receptacle at high charging rates, for example.

The control unit 118 can generate a derating command based on user location and a current charge time. Due to the length of the charging processes, the user may walk away from the electric vehicle 102 for one or more reasons. The control unit 118 can set a proximity timer that is calibrated to an expected time for which the user is expected to be away from the electric vehicle 102 during the charging process. If the user 114 returns to the electric vehicle 102 before the proximity timer expires, the control unit 118 can interpret the user's return as being unrelated to the charging process. However, if the user 114 returns to the electric vehicle at or after the proximity timer expires, the control unit 118 can interpret the user's return as meaning that the user intends to end the charging process. The control unit 118 can then derate the charging in anticipation of the user removing the charge cord 106. Derating the charging rate on user approach of the electric vehicle enhances safety conditions.

In various embodiments, the first rate and the second rate can be separated by a safe charging threshold below which it is considered safe to remove the charge coupler 116. Therefore, the user can have the charge coupler 116 locked to the charging receptacle 104 while charging at the second rate or can leave the charge coupler 116 unlocked while charging at the second rate. The safe charging threshold can be set by industry or regulatory standards. For example, a regulation may require that the receptacle be locked to the charge cord 106 for any charging rate that is above a safe charging threshold of 16 amps. In an embodiment, the control unit 118 can become aware that the user has approached to within a selected distance or boundary 120 of the electric vehicle 102 and can subsequently derate from the first charging rate above the safe charging threshold to the second charging rate below the safe charging threshold. Upon derating, the control unit 118 can unlock the charge coupler 116 while the vehicle is charging at the second rate. If the user 114 walks away again from the electric vehicle 102, the processor 119 can relock the charge coupler 116 to the charging receptacle 104 or increase the charging rate to above the selected threshold, thereby automatically relocking the charge coupler 116 to the charging receptacle 104. Additionally, the user 114 can end the charging process by pressing a selected button 111 (e.g., a STOP button) on the communication device 112, thereby allowing the user to stand clear of the electric vehicle 102 until the charging process is finished.

Figure 2:
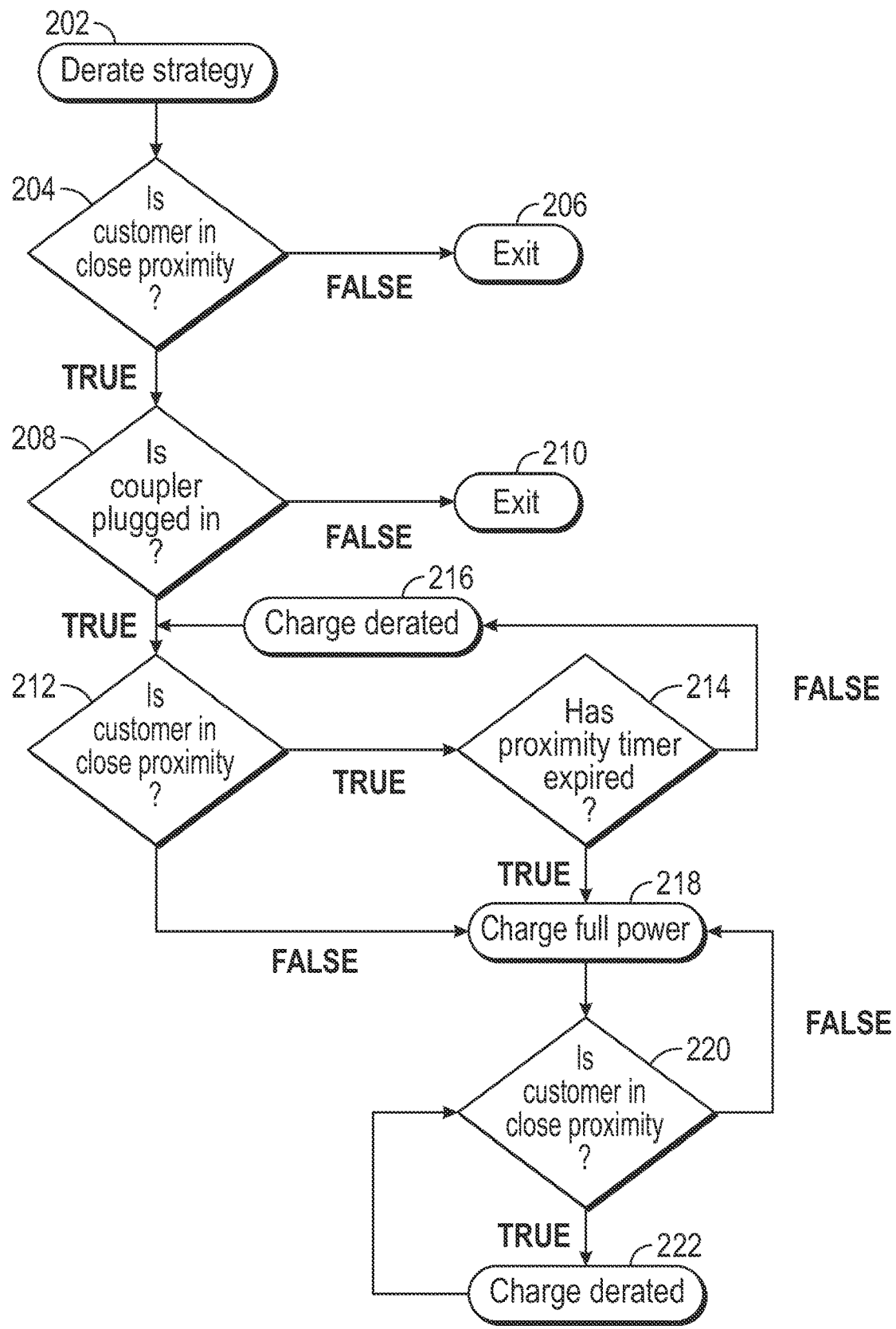
FIG. 2 shows a flowchart illustrating a method of charging the electric vehicle at different rates based on a proximity of the user to the electric vehicle.

FIG. 2 shows a flowchart 200 illustrating a method of charging the electric vehicle 102 at different rates based on a proximity of the user 114 to the electric vehicle 102. The method can be performed on the processor 119 of the control unit 118 in various aspects. The method begins at box 202. At box 204, the processor 119 determines whether the user is near the vehicle (i.e., within boundary 120). If the user is not within the boundary 120, the method proceeds to box 206 and the program ends. Referring again to box 204, if the user is within the boundary 120, the method proceeds to box 208.

At box 208, the processor 119 determines whether the charge coupler 116 is plugged into the charging receptacle 104. If the charge coupler 116 is not plugged in, the method proceeds to box 210 and the program ends. Referring again to box 208, if the charge coupler 116 is plugged in, the method proceeds to box 212. Therefore, the conditions upon proceeding to box 212 are that the charge coupler 116 is plugged into the electric vehicle 102 and the electric vehicle is being charged at a selected charging rate (e.g. the second charging rate) and the user is proximate the vehicle.

In boxes 212, 214 and 216, the processor 119 performs a loop to monitor the location of the user while the user is within the boundary 120. In box 212, the processor 119 determines whether the user remains within the boundary 120. If the user is still within the boundary 120, the method proceeds to box 214, at which the processor 119 determines whether the proximity timer has expired. If the proximity timer has not expired, then the method proceeds to box 216 in which the charging rate remains at the second charging rate. The method then proceeds from box 216 to box 212 to complete the loop.

If at box 212, the user is no longer near the vehicle, or if at box 214, proximity timer has expired, the method proceeds to box 218. At box 218, the charging rate is raised (e.g., to the first charging rate). In various embodiments, the first charging rate can be a full power charging rate. The method then proceeds to box 220.

In boxes 220, 218 and 222, the processor 119 performs a monitoring loop that monitors the surroundings of the vehicle for the return or approach of the user 114 to the vehicle. In box 220, the processor 119 determines whether the user 114 is within the boundary 120 of the electric vehicle 102 via, for example, querying the user location system 110. If the user 114 is not within the selected range, the method proceeds to box 218 and the charging proceeds at the elevated (first) rate. The method then loops back to box 220. Alternatively, at box 220, if the user has returned to within the selected range, the method proceeds to box 222. In box 222, the charging rate is derated to accommodate the proximity of the user. The method then returns to box 220 for further monitoring.

Charging the electric vehicle 102 at the elevated charge rate generates enough heat to require a cooling period before the user 114 can remove the charge cord 106 from the electric vehicle 102. Derating upon user approach starts the cooling process before the user reaches the vehicle, thereby allowing the user to remove the charge cord 106 at any earlier time than if the user were required to be physically present at the vehicle to stop the charging process.

In various embodiments, the control unit 118 can control further security or anti-theft systems of the vehicle. In particular, the control unit 118 can control locking and unlocking of the charge coupler 116 from the electric vehicle 102 and can sound a warning signal or audio signal to prevent theft, as discussed below with respect to FIGS. 3-5.

Figure 3:
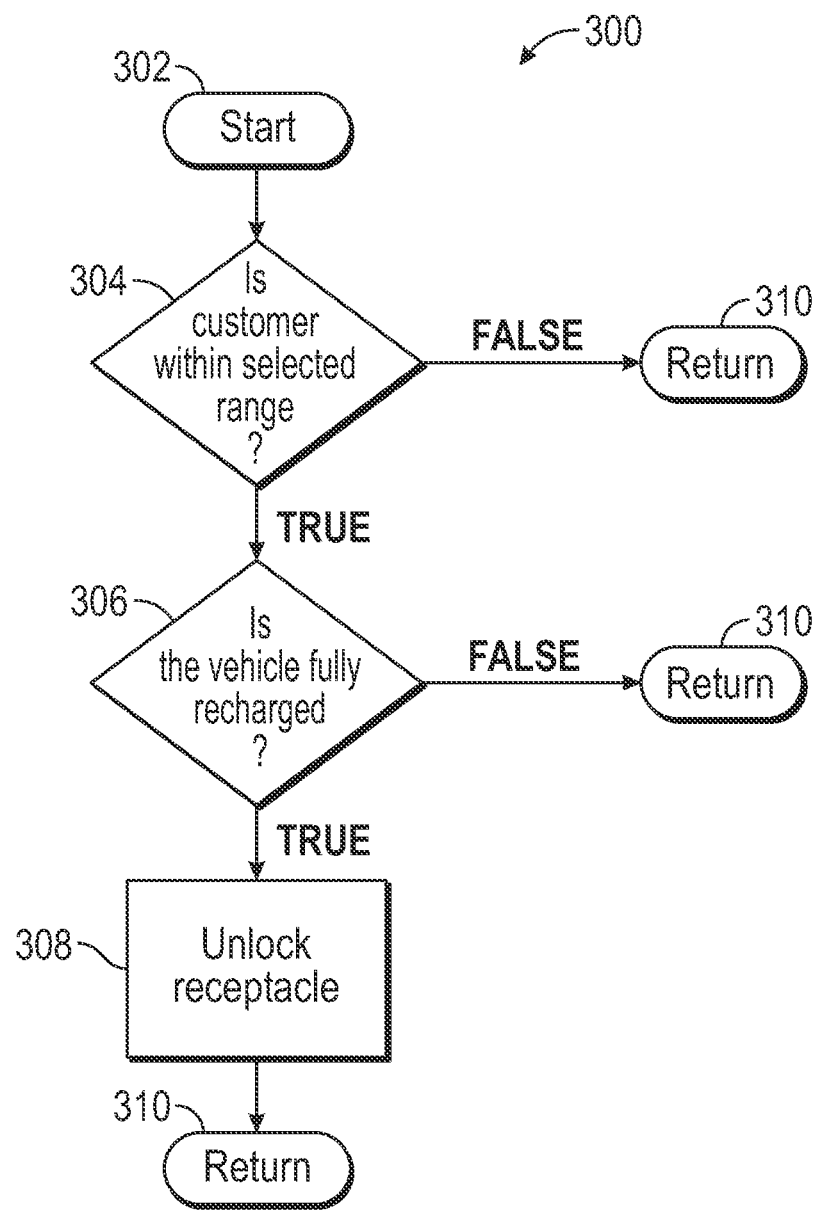
FIG. 3 shows a flowchart illustrating a method for unlocking a charge coupler from the charging receptacle of the electric vehicle.
Figure 4:
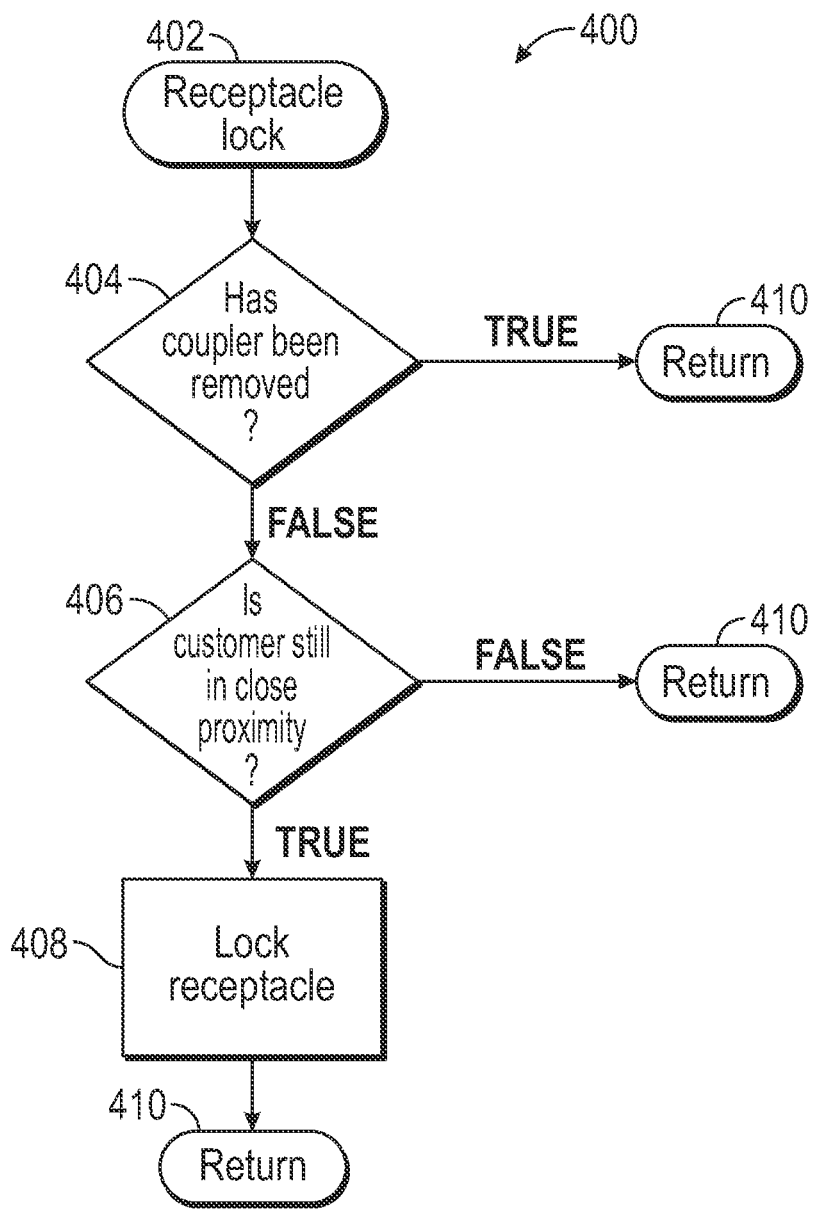
FIG. 4 shows a flowchart illustrating a method of locking or closing the receptacle after the charge cord has been removed.

FIG. 3 shows a flowchart 300 illustrating a method for unlocking a charge coupler 116 from the charging receptacle 104 of the electric vehicle 102. The method begins at box 302. In box 304, the processor 119 determines whether the user is in proximity (i.e., within boundary 120) of the electric vehicle 102. If not, the method proceeds to box 310 where the method can stop or return to box 302 to continue monitoring. However, if the user is within the boundary 120, the method proceeds to box 306. In box 306, the processor 119 determines whether the electric vehicle 102 has been recharged. If the vehicle is not fully recharged, the method proceeds to box 310 where the method can stop or return to box 302 to continue monitoring. If, however the vehicle is fully charged, the method proceeds to box 308. In box 308, the charge cord 106 is unlocked from the charging receptacle 104, after which the method can, at box 310, stop or return to box 302 for further monitoring FIG. 4 shows a flowchart 400 illustrating a method of locking or closing the receptacle after the charge cord 106 has been removed. The method beings at box 402. In box 404, the processor 119 determines whether the charge coupler 116 has been removed from the receptacle. If the charge coupler 116 has been removed, the method proceeds to box 410 where the method can stop or return to box 402 to continue monitoring. However, if the charged coupler is still in the receptacle, the method proceeds to box 406. In box 406, the processor 119 determines whether the user is still within close proximity (i.e., within the boundary 120). If the user is not within the boundary 120, the method proceeds to box 410 where the method can stop or return to box 402 to continue monitoring. However, if the user is inside the boundary 120, the method proceeds to box 408. At box 408, the receptacle is locked in order to prevent a theft of the charge coupler 116, etc. After locking the receptacle, the method can, at box 410, stop or return to box 402 for further monitoring.

Figure 5:
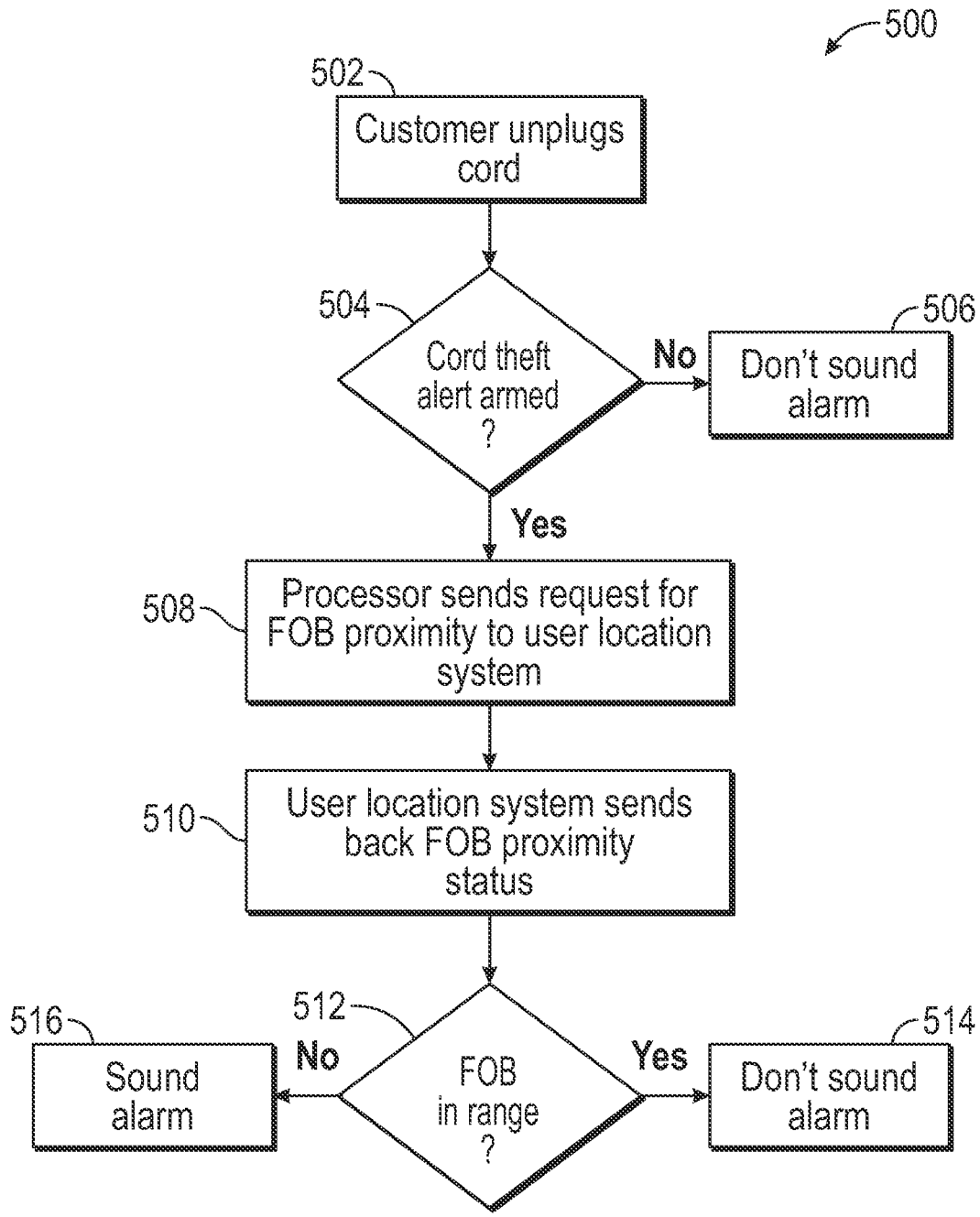
FIG. 5 shows a flowchart for a method of sounding an alarm when the charge cord is removed from the charging receptacle by someone other than the user.

FIG. 5 shows a flowchart 500 for a method of sounding an alarm 125 when the charge cord 106 is removed from the charging receptacle 104 by someone other than the user. In box 502, the charge cord 106 is removed from the charging receptacle 104. In box 504, the processor 119 determines whether a cord theft alert system is armed. If the system is not armed the method proceeds to box 506 wherein the alarm 125 is not sounded. Otherwise at box 504, if the system is armed, the method proceeds to box 508. In box 508, the processor 119 sends a request to the user location system 110 or other proximity system to determine the location of the communication device 112. In box 510, the user location system 110 receives the location of the communication device 112 and provides the location to the processor 119. In box 512, the processor 119 determines whether the communication device 112 is within a selected range. If the communication device 112 is within the selected range, then the method proceeds to box 514 and the alarm 125 is not sounded. Otherwise at box 512, if the communication device 112 is outside of the selected range, the method proceeds to box 516 and the alarm 125 is sounded.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of charging an electric vehicle, comprising:
charging the electric vehicle at a first charging rate;
determining, at a processor, a location of a user of the electric vehicle with respect to the electric vehicle;
setting a proximity timer upon commencing the charging of the electric vehicle and only adjusting the charging of the electric vehicle from the first charging rate to a second charging rate when the user is within a selected distance from the electric vehicle and at or after a time at which the proximity time expires; and unlocking a charge cord from the electric vehicle when the charging of the electric vehicle is adjusted to the second charging rate.

2. The method of claim 1, further comprising determining the location of the user via a communication between the electric vehicle and a communication device associated with the user.

3. The method of claim 1, further comprising determining a boundary surrounding at least a part of the electric vehicle, charging the electric vehicle at the first charging rate when the user is outside of the boundary and charging the electric vehicle at the second charging rate when the user is inside of the boundary.

4. The method of claim 1, further comprising sounding an audio signal when a charge cord is manually unlocked from a charging receptacle and the user is not within the selected distance.

5. The method of claim 1, further comprising relocking the charge cord to the electric vehicle when the user moves outside the selected distance.

6. A system for charging an electric vehicle, comprising:
a user locating system configured to determine a location of a user; and
a processor configured to:
charge the electric vehicle at a first charging rate;
set a proximity timer upon commencing the charging of the electric vehicle;
only adjust the charging of the electric vehicle from the first charging rate to a second charging rate when the user is within a selected distance from the electric vehicle and at or after a time at which the proximity timer expires; and
unlock a charge cord from the electric vehicle when the charging of the electric vehicle is adjusted to the second charging rate.

7. The system of claim 6, wherein the user locating system is further configured to determine the location of the user via a communication with a communication device associated with the user.

8. The system of claim 6, wherein the user locating system is further configured to define a boundary surrounding at least a part of the electric vehicle and the processor is further configured to charge the electric vehicle at the first charging rate when the user is outside of the boundary and charge the electric vehicle at the second charging rate when the user is inside of the boundary.

9. The system of claim 6, wherein the processor is further configured to sound an audio signal when a charge cord is manually unlocked from a charging receptacle and the user is not within the selected distance.

10. The system of claim 6, wherein the processor is further configured to relock the charge cord to the electric vehicle when the user moves outside the selected distance.

11. An electric vehicle, comprising:
a user locating system configured to determine a location of a user; and
a processor configured to:
charge the electric vehicle at a first charging rate;
set a proximity timer upon commencing the charging of the electric vehicle;
only adjust the charging of the electric vehicle from the first charging rate to a second charging rate when the user is within a selected distance from the electric vehicle and at or after a time at which the proximity timer expires; and
unlock a charge cord from the electric vehicle when the charging of the electric vehicle is adjusted to the second charging rate.

12. The electric vehicle of claim 11, wherein the user locating system is further configured to determine the location of the user via a communication with a communication device associated with the user.

13. The electric vehicle of claim 11, wherein the user locating system is further configured to define a boundary surrounding at least a part of the electric vehicle and the processor is further configured to charge the electric vehicle at the first charging rate when the user is outside of the boundary and charge the electric vehicle at the second charging rate when the user is inside of the boundary.

14. The electric vehicle of claim 11, wherein the processor is further configured to sound an audio signal when a charge cord is manually unlocked from a charging receptacle and the user is not within the selected distance.

15. The electric vehicle of claim 11, wherein the processor is further configured to relock the charge cord to the electric vehicle when the user subsequently moves outside the selected distance.

* * * * *